United States Patent [19]

Sukahara et al.

[11] Patent Number: 4,625,556
[45] Date of Patent: Dec. 2, 1986

[54] METHOD OF LAYER THICKNESS MEASUREMENT

[75] Inventors: Yusuke Sukahara, Tokyo; Eiji Takeuchi; Eisaku Hayashi, both of Urawa, all of Japan

[73] Assignee: Toppan Printing Co., Ltd., Tokyo, Japan

[21] Appl. No.: 751,299

[22] Filed: Jul. 2, 1985

[30] Foreign Application Priority Data

Jul. 10, 1984 [JP] Japan ............................ 59-142573

[51] Int. Cl.⁴ .......................................... G01N 29/00
[52] U.S. Cl. ..................................................... 73/602
[58] Field of Search ................. 73/602, 620, 624, 628, 73/606, 607

[56] References Cited

U.S. PATENT DOCUMENTS 4,098,129 7/1978 Deblaere et al. ..................... 73/602
4,274,288 6/1981 Tittmann et al. ..................... 73/602

OTHER PUBLICATIONS

J. L. Rose et al., *Materials Evaluation*, Dec. 1974, pp. 249–258.
Wilson et al., *Journal of Applied Physics*, 55(9), 1 May 1984, pp. 3261–3275.
Yamanaka, *Journal of Applied Physics*, 54(8), Aug. 1983, pp. 4323–4329.

Primary Examiner—Stephen A. Kreitman
Attorney, Agent, or Firm—Bacon & Thomas

[57] ABSTRACT

The layer thickness of an object including a substrate and a layer formed thereon is measured by the following steps. First, with regard to a reference system consisting of a reference substrate and a reference layer formed thereon, which are formed of the same materials as those of the object, and an ultrasonic wave propagation medium, the incident angle $\theta$ at which an ultrasonic wave is applied through the propagation medium to the reference layer and the product H of the frequency of the ultrasonic wave and the thickness of the reference layer are calculated, the incident angle $\theta$ and product H having such values as minimize the intensity of the ultrasonic wave reflected from the reference layer. The layer of the object is put in contact with the ultrasonic wave propagation medium, and an ultrasonic wave is applied to the layer through the propagation medium at the incident angle $\theta$. Then, the frequency of the ultrasonic wave reflected from the layer is measured to detect the frequency of the incident ultrasonic wave for the minimum reflected wave intensity. The thickness of the layer of the object is calculated from the detected frequency and the value H.

6 Claims, 6 Drawing Figures

F I G. 4
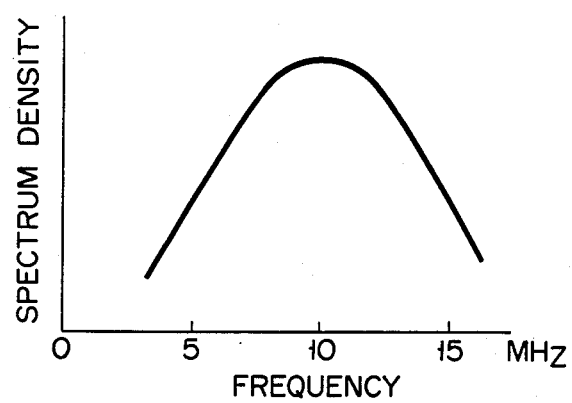
F I G. 5
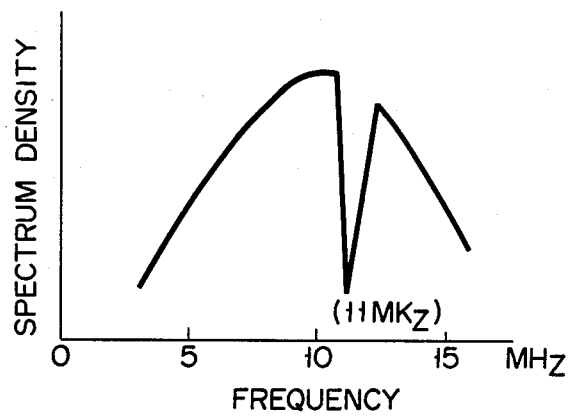
F I G. 6
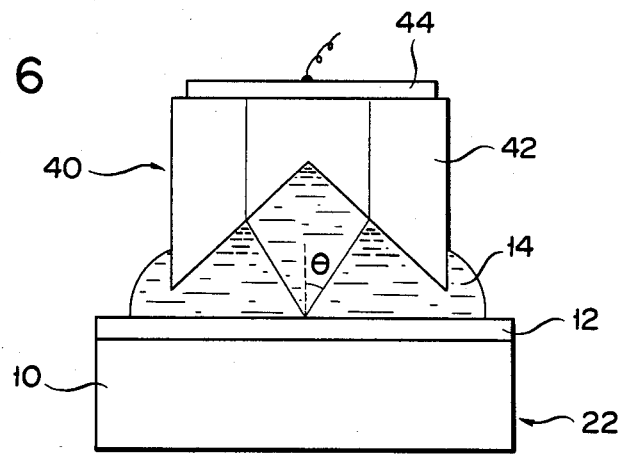

METHOD OF LAYER THICKNESS MEASUREMENT

BACKGROUND OF THE INVENTION

The present invention relates to a method for measuring the thickness of a thin layer formed on a substrate by, e.g., plating, coating or painting.

Methods are conventionally known in which the thickness of a layer formed on a substrate is measured by means of ultrasonic waves. According to these methods, ultrasonic waves are generally applied to the layer and substrate through a liquid for ultrasonic propagation, and reflected or transmitted ultrasonic waves are then detected by suitable means.

In one such prior art method using ultrasonic measurement, impulsive ultrasonic waves are applied to the layer, and the layer thickness is measured in accordance with the time lag of reflected ultrasonic pulses. In the case of this method, however, the measurable time lag should be restricted to substantially the same degree as the pulse width of ultrasonic waves. Therefore, the layer thickness d measurable by this method is given by $$d \approx C \cdot T \approx C/f$$

where T is the pulse width, f is the center frequency of ultrasonic wave, and C is the acoustic velocity for the layer. When measuring the thickness of a metal layer by means an impulsive ultrasonic wave with the center frequency of 100 MHz, for example, the measurable layer thickness ranges from about 30 μm upward.

Other conventional methods of measurement include a method which utilizes a phenomenon whereby an ultrasonic wave applied to a layer to be measured resonates when the thickness of the layer is equivalent to an integral multiple of one quarter-wavelength of the ultrasonic wave, and a method in which the layer thickness is measured by taking advantage of such characteristics of an elastic surface wave that its acoustic velocity varies with the layer thickness.

The utilization of resonance for the measurement involves the following problems. This method cannot measure a layer having thickness smaller than the quarter-wavelength of the ultrasonic wave in the layer. Additionally, the variation of the amplitude of the reflected ultrasonic wave, caused by resonance, is small. Also, the Q value of resonance is small.

In the method of measurement utilizing the acoustic velocity variation of an elastic surface wave, the so-called V(z) curve of an acoustic microscope may be used to indicate interference between a reflected wave from the layer surface and the elastic surface wave. In this case, however, the substrate must be scanned by an ultrasonic acoustic lens in a direction perpendicular to the substrate, that is, in the z direction, requiring much time for one cycle of measurement. Thus, this method is unfit for on-line measurement. Also, plane scanning by the acoustic lens is unsuited for the measurement of two-dimensional distribution of layer thickness.

SUMMARY OF THE INVENTION

The present invention is contrived in consideration of these circumstances, and is intended to provide a method of measurement capable of quickly measuring layer thicknesses in a wide range.

In order to achieve the above object, the inventors hereof studied intensively a reflected wave intensity minimization phenomenon. More to the point, the inventors made experiments on a number of samples, and found that the reflection coefficient of an ultrasonic wave applied to a layer of a reference system, consisting of a substrate, the layer on the substrate and an ultrasonic wave propagation medium put in contact with the layer, at an incident angle $\theta$, peculiar thereto, becomes very small when the product of the frequency f of the ultrasonic wave and layer thickness d takes a specific value H. In measuring the thickness of a layer of an object of measurement having a layer and substrate which are formed of the same materials as the layer and substrate of the reference system, if an ultrasonic wave is applied to the layer of the object at the incident angle $\theta$ and the frequency of the incident ultrasonic wave for a minimum reflected wave intensity is measured, the layer thickness d can be calculated from the measured frequency and the value H.

According to the present invention, there is provided a method of measurement which comprises steps of obtaining an incident angle $\theta$ at which an ultrasonic wave is applied through an ultrasonic wave propagation medium to a reference layer made of the same material as the layer of the object and formed on a reference substrate made of the same material as the substrate of the object, and the product H of the frequency of the ultrasonic wave and the thickness of the reference layer, said incident angle $\theta$ and the product H having such values as minimize the intensity of the ultrasonic wave reflected from the reference layer; bringing the layer of the object into contact with the ultrasonic wave propagation medium; applying an ultrasonic wave to the layer of the object through the propagation medium at the incident angle $\theta$; measuring the frequency of the ultrasonic wave reflected by the layer to detect the frequency of the incident ultrasonic wave for the minimum reflected wave intensity; and calculating the thickness of the layer of the object from the value H and the detected frequency.

BRIEF DESCRIPTION OF THE DRAWINGS

FIGS. 4 and 5 show characteristic curves representing frequency distribution; and FIG. 6 is a schematic side view showing a modified example of the measuring apparatus.

DETAILED DESCRIPTION OF THE PREFERRED EMBODIMENT

The present invention will now be described in detail with reference to the accompanying drawings.

First, the reflected wave intensity minimization phenomenon, on which the present invention is based, will be explained.

The inventors hereof combined various substrates, layers and ultrasonic wave propagation media, and examined the reflection coefficient for resulting reference systems, applying ultrasonic waves to the systems. As a result of the measurement of the reflection coefficient for a wide range of incident angle $\theta$ and frequency f of ultrasonic waves, it was found that if an ultrasonic wave is applied to a reference system, consisting of a substrate, a layer formed on the substrate and a propagation medium put in contact with the layer, at an incident angle $\theta$, peculiar thereto, the reflection coefficient is minimized when the product of the frequency f and layer thickness d reaches a specific value H for the reference system.

Also, the inventors hereof made an elastodynamic analysis of the reflection coefficient of an ultrasonic wave which is applied to the layer of the reference system, and found that the reflection coefficient is minimized when the ultrasonic wave is applied at the incident angle $\theta$ and the product of the frequency f of the ultrasonics wave and layer thickness d takes the specific value H, which is the same result as obtained in the aforementioned measurement.

The inventors hereof further investigated the cause of the reflected wave intensity minimization phenomenon, and detected that if the product of the ultrasonic frequency and layer thickness takes the specific value H when applying the ultrasonic wave to the reference system at the incident angle $\theta$, Sezawa wave propagating along the layer is excited in the layer and part of the incident ultrasonic wave leaks into the substrate when the phase velocity of the Sezawa wave is greater than the transverse velocity of the substrate. As a result, the reflected wave intensity becomes small.

A method of calculation of the reflected wave intensity based on the elastodynamic analysis will now be described in detail.

Figure 1:
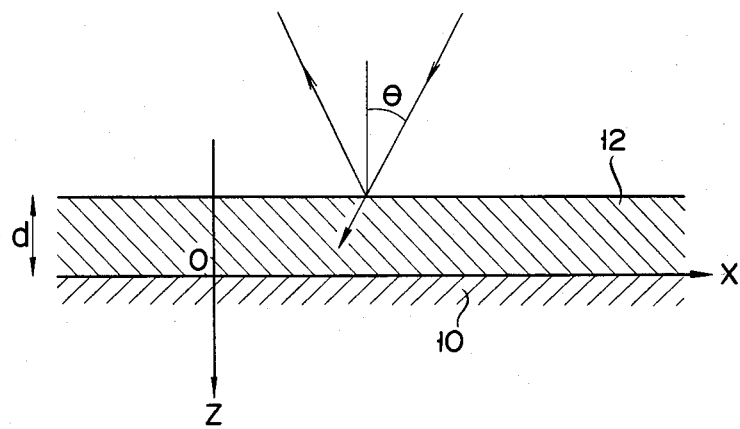
FIG. 1 is a schematic view showing a coordinate system for illustrating the present invention.

As shown in FIG. 1, a layer 12 with the thickness d is formed on a half-unlimited substrate 10, and a reflected wave intensity, resulting when an ultrasonic wave is projected at the incident angle $\theta$ on the layer 12 through water in contact therewith, is calculated, based on a method stated in "Journal of Applied Physics" (D. E. Chimenti, A. H. Nayfeh and D. L. Butler), 1982, 53(1), p. 170.

The origin of coordinates is fixed on the substrate, and the positive direction of the z coordinate axis is set to represent the vertically downward direction. Thereupon, the boundary between the fluid (propagation medium) and the layer 12 is represented by $z=-d$, and that between the layer 12 and substrate 10 by $z=0$. This phenomenon, which may be regarded as independent of the y coordinate, is handled as a two-dimensional phenomenon.

The density is given by $\rho$, Lamé's constants by $\lambda$ and $\mu$, and acoustic velocity by C. Superscripts f, o and s are attached to those symbols which represent values related to the fluid, layer and substrate, respectively.

If the velocity potentials of longitudinal and transverse waves are $\phi$ and $\psi$, respectively, the x and z components u and w of a displacement vector, and stresses $\sigma_{zz}$ and $\sigma_{xz}$ may be expressed as follows:

$$u = \frac{\partial \phi}{\partial x} - \frac{\partial \psi}{\partial x} \tag{1}$$

$$w = \frac{\partial \phi}{\partial z} + \frac{\partial \psi}{\partial x} \tag{2}$$

$$\sigma_{zz} = (\lambda + 2\mu)\frac{\partial^2 \phi}{\partial z^2} + \lambda \frac{\partial^2 \phi}{\partial x^2} + 2\mu \frac{\partial^2 \psi}{\partial x \partial z} \tag{3}$$

$$\sigma_{xz} = \mu\left(2\frac{\partial^2 \phi}{\partial x \partial z} + \frac{\partial^2 \psi}{\partial x^2} - \frac{\partial^2 \psi}{\partial z^2}\right) \tag{4}$$

The Lamé's constants $\lambda$ and $\mu$ have the following relations to the acoustic velocities $C_e$ and $C_t$ of the longitudinal and transverse waves, and the density.

$$C_e^2 = \frac{\lambda + 2\mu}{\rho} \tag{5}$$

$$C_t^2 = \frac{\mu}{\rho}$$

Since only the longitudinal wave exists in the fluid, eqs. (1) to (5) can be rearranged as follows:

$$u^f = \frac{\partial \phi^f}{\partial x}$$

$$w^f = \frac{\partial \phi^f}{\partial z}$$

$$\sigma_{zz}^f = \lambda^f\left(\frac{\partial^2 \phi^f}{\partial z^2} + \frac{\partial^2 \phi^f}{\partial x^2}\right)$$

$$\lambda^f = \rho^f C^{f2}$$

$$\psi^f = 0$$

$$\mu^f = 0$$

The displacement and stresses are defined individually for the fluid, layer and substrate, and must fulfill the requirement for continuity at the individual boundaries. Thus, we have $$u^s = u^o$$

$$w^s = w^o$$

$$\sigma_{zz}^s = \sigma_{zz}^o$$

$$\sigma_{xz}^s = \sigma_{xz}^o$$

where $z=0$, and $$w^o = w^f$$

$$\sigma_{zz}^o = \sigma_{zz}^f$$

$$\sigma_{xz}^o = 0$$

where $z=-d$. Here the viscosity of the fluid at the boundary between fluid and layer $(z=-d)$ is ignored, so that motion in the x-direction is regarded as discontinuous, and shearing stress is considered zero.

Both incident and reflected waves exist in the fluid and layer, while only the incident wave is present in the substrate, so that potentials in the individual media may be given as follows:

$$\phi^s = \phi_1^s \exp(i\zeta_e^s z + i\eta)$$

$$\psi^s = \psi_1^s \exp(i\zeta_t^s z + i\eta)$$

$$\phi^o = \phi_1^o \exp(i\zeta_e^o z + i\eta) + \phi_2^o \exp(-i\zeta_e^o z + i\eta)$$

$$\psi^o = \psi_1^o \exp(i\zeta_t^o z + i\eta) + \psi_2^o \exp(-i\zeta_t^o z + i\eta)$$

$$\phi^f = \phi_1^f \exp(i\zeta_t^f(z+d)+i\eta) + \phi_2^f \exp(-i\zeta_t^f(z+d)+i\eta)$$

Here subscripts 1 and 2 are indicative of the incident and reflected waves, respectively, and $\zeta_\alpha^\beta$ ($\alpha = l$ or $t$, $\beta = f$, o or s) is the z component of wave vector, which is given by $$\zeta_\alpha^\beta = \sqrt{k_\alpha^{\beta 2} - \xi^2}$$

$$k_\alpha^\beta = \frac{w}{C_\alpha^\beta}$$

where $\omega$ is angular frequency. Symbol $\xi$ indicates the x component of the wave vector as an invariable, which is given by $$\xi = k^f \sin \theta$$

where $\theta$ is the incident angle. Also, we have $\zeta = \xi x - wt$.

Substituting the individual potentials into the equations indicative of the boundary conditions, we obtain $$\xi(\phi_1 + \phi_2{}^o) - \zeta_t{}^o(\psi_1{}^o - \psi_2{}^o) - \xi \phi_1{}^s + \zeta_t{}^s \psi_1{}^s = 0$$

from $u^s = u^o$ and $z=0$, $$\zeta_t{}^o(\phi_1{}^o - \phi_2{}^o) + \xi(\psi_1{}^o - \psi_2{}^o) - \zeta_t{}^s \phi_1{}^s - \xi \psi_1{}^s = 0$$

from $w^s = w^o$ and $z=0$, $$2\mu^o \zeta_t{}^o \xi (\phi_1{}^o - \phi_2{}^o) + \mu^o(\xi^2 - \zeta_t{}^{o2})(\psi_1{}^o + \psi_2{}^o)$$
$$-2\mu^s \zeta_t{}^s \xi \phi_1{}^s - \mu^s(\xi^2 - \zeta_t{}^{s2})\psi_1{}^2 = 0$$

from $\sigma_{zz}{}^s = \sigma_{zz}{}^o$ and $z=0$, $$\zeta_t{}^f \cos(\zeta_t{}^f d) \times (\phi_1{}^o - \phi_2{}^o) - i\zeta_t{}^f \sin(\zeta_t{}^f d) \times (\phi_1{}^o + \phi_2{}^o)$$
$$+\epsilon \cos(\zeta_t{}^f d) \times (\psi_1{}^o + \psi_2{}^o) - i\xi \sin(\zeta_t{}^f d) \times (\psi_1{}^o - \psi_2{}^o)$$
$$+\zeta_t{}^f \phi_2{}^f = \zeta_t{}^f \phi_1{}^f$$

from $\delta_{xz}{}^s = \sigma_{xz}{}^o$ and $z=0$, $$\zeta_t{}^f \cos(\zeta_t{}^f d) \times (\phi_1{}^o - \phi_2{}^o) - i\zeta_t{}^f \sin(\zeta_t{}^f d) \times (\phi_1{}^o + \phi_2{}^o)$$
$$+\xi \cos(\zeta_t{}^f d) \times (\psi_1{}^o + \psi_2{}^o) - i\xi \sin(\zeta_t{}^f d) \times (\psi_1{}^o - \psi_2{}^o)$$
$$+\zeta_t{}^f \phi_2{}^f = \zeta_t{}^f \phi_1{}^f$$

from $w^o = w^f$ and $z=-d$, $$\{(\lambda^o + 2\mu^o)\zeta_t{}^{o2} + \lambda^o \xi^2\} \cos(\zeta_t{}^f d) \times (\phi_1{}^o + \phi_2{}^o)$$
$$-i\{(\lambda^o + 2\mu^o)\zeta_t{}^{o2} + \lambda^o \xi^2\} \times \sin(\zeta_t{}^f d) \times (\phi_1{}^o - \phi_2{}^o)$$
$$+2\mu^o \zeta_t{}^o \xi \cos(\zeta_t{}^f d) \times (\psi_1{}^o - \psi_2{}^o) - i2\mu^o \zeta_t{}^o \xi \sin(\zeta_t{}^f d)$$
$$\times (\psi_1{}^o + \psi_2{}^o) - \rho^f w^2 \phi_2{}^f = \rho^f w^2 \phi_1{}^f$$

from $\sigma_{zz}{}^o = \sigma_{zz}{}^f$ and $z=-d$, and $$2\mu^o \zeta_t{}^o \xi \cos(\zeta_t{}^f d) \times (\phi_1{}^o - \phi_2{}^o) - i2\mu^o \zeta_t{}^o \xi \sin(\zeta_t{}^f d)$$
$$\times (\phi_1{}^o + \phi_2{}^o) + \mu^o(\xi^2 - \zeta_t{}^{o2}) \cos(\zeta_t{}^o d) \times (\psi_1{}^o + \psi_2{}^o)$$
$$-i(\xi^2 - \zeta_t{}^{o2})\mu \sin(\zeta_t{}^f d)(\psi_1{}^o - \psi_2{}^o) = 0$$

from $\sigma_{xz}{}^o = 0$ and $z=-d$. Hereupon, the following values are introduced into the above equations to make them dimensionless.

$$\overline{\zeta_\alpha^\beta} \equiv \frac{\zeta_\alpha^\beta}{\zeta} \quad \overline{\mu^o} \equiv \frac{\mu^o}{\mu^s}$$

$$C_r = \frac{w}{\xi} \quad Q \equiv \frac{wd}{C_t^s}$$

$$\overline{w} \equiv \xi d = \frac{wd}{C_r} = \frac{QC_t^s}{C_r}$$

These equations may be replaced by the following matrix equation.

$$\begin{pmatrix} 1 & 0 & -a_1 & 0 & -1 & a_3 & 0 \\ 0 & a_2 & 0 & 1 & -a_4 & -1 & 0 \\ b_1 & 0 & 2b_2 & 0 & C_1 & -2a_3 & 0 \\ 0 & -2b_3 & 0 & b_1 & 2a_4 & C_1 & 0 \\ a_2x_1 & ia_2y_1 & \tfrac{1}{2}C_2x_2 & \tfrac{i}{2}C_2y_2 & 0 & 0 & 0 \\ -iC_3y_1 & -C_3x_1 & -2ia_1y_2 & -2a_1x_2 & 0 & 0 & id_1 \\ a_2x_1 & ia_2y_1 & x_2 & iy_2 & 0 & 0 & ia_5 \end{pmatrix} \begin{pmatrix} \phi_1{}^o + \phi_2{}^o \\ \phi_1{}^o - \phi_2{}^o \\ \psi_1{}^o - \psi_2{}^o \\ \psi_1{}^o + \psi_2{}^o \\ \phi_1{}^s \\ \psi_1{}^s \\ \phi_2{}^f \end{pmatrix} = \begin{pmatrix} 0 \\ 0 \\ 0 \\ 0 \\ 0 \\ -id_1\phi_1{}^f \\ ia_5\phi_1{}^f \end{pmatrix}$$

where $a_1 = \overline{\zeta_t{}^o}$, $a_2 = \overline{\zeta_l{}^o}$, $a_3 = \overline{\zeta_t{}^s}$, $a_4 = \overline{\zeta_l{}^s}$, $a_5 = \overline{\zeta_l{}^f}$, $b_1 = \overline{\mu^o}(\overline{\zeta_t{}^{o2}} - 1)$, $b_2 = \overline{\mu_o} \overline{\zeta_l{}^o}$, $b_3 = \overline{\mu^o}\overline{\zeta_t{}^o}$, $C_1 = 1 - \overline{\zeta_t{}^{s2}}$, $C_2 = 1 - \overline{\zeta_t{}^{o2}}$, $C_3 = \overline{\zeta_t{}^{o2}} - 1$, $$d_1 = \frac{\rho^f C_r^2}{\rho^o C_t^{o2}}, \quad x_1 = \sin\overline{w}\overline{\zeta_l{}^o},$$

$x_2 = \sin\overline{w}\overline{\zeta_t{}^o}$, $y_1 = \cos\overline{w}\overline{\zeta_l{}^o}$, and $y_2 = \cos\overline{w}\overline{\zeta_t{}^o}$.

Based on the ratio between the incident wave potential $\phi_1{}^f$ and reflected wave potential $\phi_2{}^f$, the reflection coefficient R is given by $$R \equiv \frac{\phi_2{}^f}{\phi_1{}^f}$$

Since generality can be maintained if the potential $\phi_1{}^f$ is regarded as 1 in the calculation, the reflection coefficient R equals the value $\phi_2{}^f$, calculated by substituting $\phi_1{}^f=1$ into the matrix equation.

If the dimensionless matrix is A, the value $\phi_2{}^f$, according to Cramer's rule, is given by $$\phi_2{}^f = \frac{det\phi_2{}^f}{detA}$$

where $det\phi_2{}^f$ is a determinant obtained by substituting the right-side vectors for the seventh column of the matrix A corresponding to $\phi_2{}^f$. Based on the Laplace expansion, the above equation may be rearranged as follows:

$$R = \frac{\overline{\mu^o}\overline{\zeta^f}detA_6^{7.7} + \overline{\mu^f}(1 + \overline{\zeta^{f2}})detA_6^{6.7}}{\overline{\mu^o}\overline{\zeta^f}detA_6^{7.7} - \overline{\mu^f}(1 + \overline{\zeta^{f2}})detA_6^{6.7}}$$

Here $\overline{\mu^f} \equiv \mu^f/\mu^s$ and $A_6^{7.7}$ and $A_6^{6.7}$ are minor matrices of the matrix A.

Figure 2:
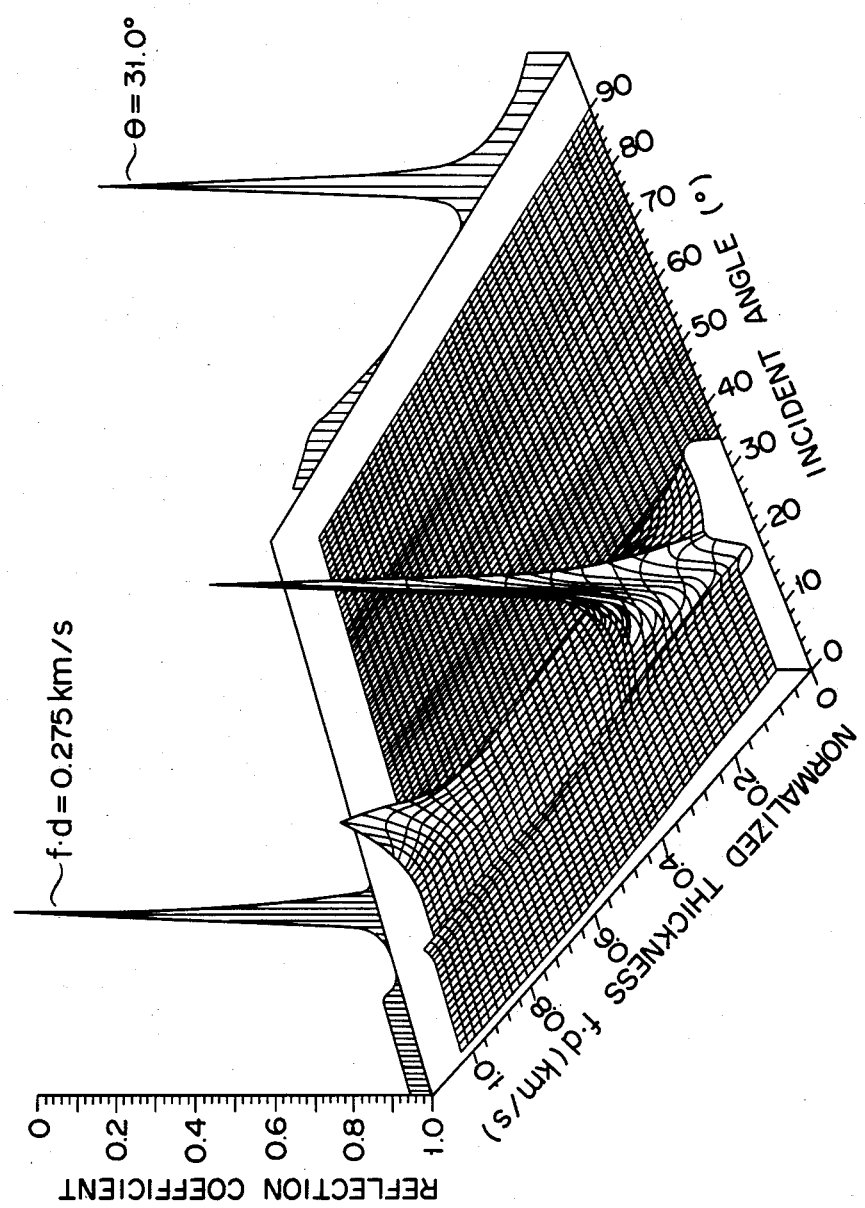
FIG. 2 is a characteristic diagram showing variations of a reflection coefficient.

Based on eq. (6), the reflection coefficient R, to be obtained with use of water for the ultrasonic wave propagation medium, gold for the layer 10, and 42-alloy (Fe-42% Ni) for the substrate 12, was calculated with the incident angle $\theta$ and the product f·d of frequency and layer thickness as parameters. The acoustic characteristics of the individual media are shown in the table below. FIG. 2 shows variations of the absolute value of the reflection coefficient R resulting when the incident angle $\theta$ is changed from 0° to 90° at one-degree intervals, and the product f·d from 0 km/s to 1.0 km/s at intervals of 0.025 km/s. As seen from FIG. 2, absolute value of the reflection coefficient R for a sample consisting of the aforesaid combination is minimized when $\theta=31°$ and $f·d=0.275$ km/s.

(TABLE)

| | DENSITY (g/cm³) | LONGITUDINAL WAVE VELOCITY (m/s) | TRANSVERSE WAVE VELOCITY (m/s) |
|---|---|---|---|
| H₂O | 1.0 | 1483 | — |
| Au | 19.32 | 3240 | 1220 |
| Fe-42% Ni | 8.1 | 4860 | 2600 |
| Cu | 8.9 | 4800 | 1900 |
| Fe | 7.7 | 5940 | 3230 |
| Sn | 7.3 | 3320 | 1670 |

As described above, if an ultrasonic wave is applied to a reference system consisting of a propagation medium, layer and substrate at the specific incident angle $\theta$ of the system, the reflection coefficient R is minimized when the product f·d of the frequency and layer thickness takes the specific value H, that is, when we have $$d \cdot f = H \quad (7)$$

Therefore, if the thickness d of the layer of the complex structure is unknown, it can be calculated from a measured value of the frequency for the minimum reflection coefficient R in accordance with eq. (7).

There will now be described a method for measuring the layer thickness that takes advantage of the reflected wave intensity minimization phenomenon.

Figure 3:
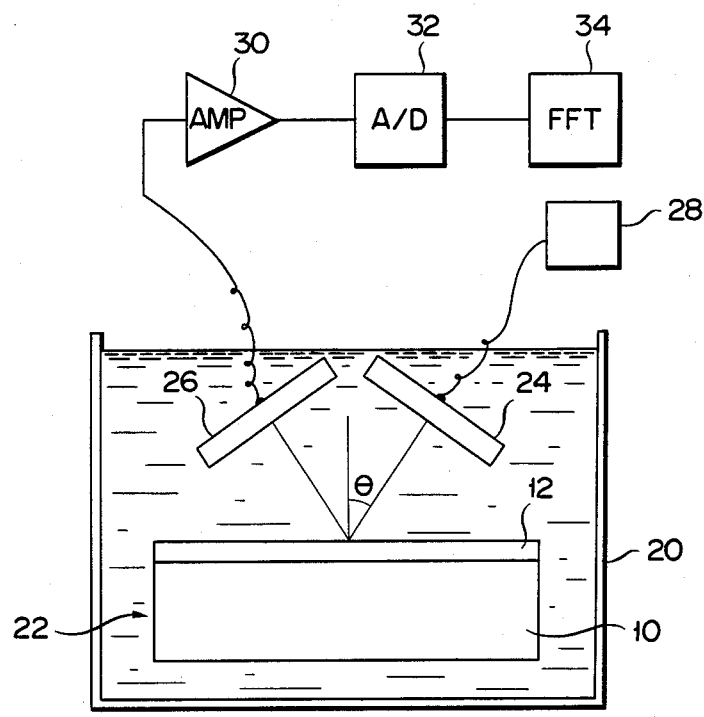
FIG. 3 is a schematic side view showing an example of a measuring apparatus used to effect the invention.

FIG. 3 shows a measuring apparatus for effecting the method of measurement of the invention. This apparatus comprises a vessel 20 filled with an ultrasonic wave propagation medium, such as water 14. Disposed in the water 14 is an object 22 of measurement which includes a substrate 10 and a layer 12 formed thereon. Arranged in the vessel 20 are a first piezoelectric transducer 24 for applying ultrasonic waves to the layer 12 of the object 22 through the water 14, and a second piezoelectric transducer 26 for receiving the ultrasonic waves reflected by the object 22. The first transducer 24 is connected to a pulse generator 28, while the second transducer 26 is connected to a fast Fourier transformer 34 through an amplifier 30 and an analog-to-digital converter 32.

The method of layer thickness measurement using the measuring apparatus of this construction will now be described in detail.

(Example 1)

In this example, the thickness of the gold plating of an object 22, consisting of a substrate 10 of 42-alloy (Fe-42% Ni) plated with gold, is measured, with water as an ultrasonic wave propagation medium.

First, the reflection coefficient R, for a reference system consisting of 42-alloy, gold and water, is calculated in accordance with eq. (6), using the incident angle and the product of the frequency of the ultrasonic wave and the layer thickness as parameters. The table shows the density and acoustic velocities of the individual elements of the reference system, while FIG. 2 illustrates the variations of the absolute value of the reflection coefficient R. The incident angle $\theta$ and the value H (layer thickness d × frequency f) for the minimum reflection coefficient R are found in FIG. 2. In this example, the reflection coefficient R is minimized when $\theta=31°$ and $H=0.275$ km/s.

Subsequently, the object 22 is immersed horizontally in the water 14 in the vessel 20, and an impulsive ultrasonic wave, having wide range of frequency components, is applied from the first transducer 24 to the gold plating 12 at the incident angle $\theta=31°$. The second transducer 26 receives the ultrasonic wave reflected by the gold plating 12 to measure the frequency of the reflected ultrasonic wave, and the frequency f for the minimum reflected wave intensity is detected. The detection of the frequency f for the minimum reflected wave intensity is accomplished by a frequency analysis of the reflected ultrasonic wave. FIGS. 4 and 5 show the frequency distribution of the reflected ultrasonic wave at the nongilded and gilded portions, respectively, of the object 22. As seen from FIG. 5, the reflected wave intensity is minimized when the frequency f is 11 MHz.

Substituting the detected frequency $f=11$ MHz and $H=0.275$ km/s into eq. (7), we can obtain $d=25$ μm.

After the thickness of the gold plating was measured by the above described method, the object 22 was cut and its section was ground. Thereupon, the thickness of the gold plating actually measured 25 μm.

(Example 2)

In this embodiment, the thickness of a tin plating of an object 22, consisting of a substrate 10 of iron plated with tin, is measured with water as an ultrasonic wave propagation medium.

The density and acoustic velocities of the individual elements of the object are shown in the table. The reflection coefficient R for a reference system consisting of iron, tin and water was calculated, and it was found that the reflection coefficient R is minimized when the incident angle $\theta=20°$ and $H=0.40$ km/s.

As a result of the measurement of a reflected ultrasonic wave in the same manner as in Example 1, it was revealed that the reflected wave intensity is minimized when the frequency f is 8 MHz. From eq. (7), therefore, $d=50$ μm may be obtained for the thickness of the tin plating.

After the object was cut and its section was ground, the thickness of the tin plating actually measured 50 μm.

According to the method of measurement described above, a wide range of layer thickness, that is, even the thickness of a very thin layer, can easily be measured in response to generation of a single pulse in a short time without requiring mechanical scanning. In Example 1, for instance, the wavelength of the longitudinal wave in the gold plating is 324 μm for an ultrasonic wave with a frequency of 10 MHz, and thus, the minimum measurable layer thickness for the prior art method may be approximately 80 μm. According to the method of measurement of the present invention, however, even a thickness (25 μm in Example 1) less than one-tenth the wavelength of the longitudinal wave can be measured with ease.

It is to be understood that the present invention is not limited to the embodiments described above, and that various changes and modifications may be effected therein by one skilled in the art, without departing from the scope or spirit of the invention. For example, the object to be measured by the method of the invention is not limited to the ones used in the above embodiments. The material for the substrate is not limited to a metal such as an iron or nickel-based alloy, and may be ceramics or the like. Also, the layer may be formed of a deposited layer, paint coating, printing ink layer or the like, as well as a metal plating. Moreover, besides water, alcohol, mercury or liquid helium may be used as the ultrasonic wave propagation medium.

In measuring the frequency, the power spectral density of the incident ultrasonic wave may be deducted from that of the reflected ultrasonic wave so that the frequency for the minimum reflected wave intensity is detected, as opposed to using frequency analysis.

In the above embodiments, the frequency for the minimum reflected wave intensity is detected by applying the ultrasonic wave, including a plurality of frequency components, to the object and analyzing the frequency of the reflected ultrasonic wave. Alternatively, however, the frequency for the minimum reflected wave intensity may be detected by applying an ultrasonic wave, including a single frequency component, to the object while continuously changing the frequency of the ultrasonic wave, and detecting the frequency for the minimum reflected wave intensity.

Furthermore, the measuring apparatus may be constructed as shown in FIG. 6. In this apparatus, an ultrasonic microscopic lens 40 is used as the ultrasonic generating means. The microscopic lens 40 includes an acoustic lens 42 formed of fused quartz, sapphire or other propagating material and having a wedge-shaped notch, and a piezoelectric transducer 44 attached to the top end of the acoustic lens 42. The ultrasonic microscopic lens 40 projects an ultrasonic wave on the layer 12 of the object 22 at the predetermined incident angle $\theta$, and receives the reflected ultrasonic wave from the layer 12. In FIG. 6, numeral 14 designates water as an ultrasonic wave propagation medium in contact with the acoustic lens 42 and the layer 12.

What is claimed is:

1. A method for measuring the layer thickness of an object including a substrate and a layer formed thereon, comprising steps of:

obtaining the incident angle $\theta$ at which an ultrasonic wave is applied through an ultrasonic wave propagation medium to a reference layer made of the same material as the layer of the object and formed on a reference substrate made of the same material as the substrate of the object, and the product H of the frequency of the ultrasonic wave and the thickness of the reference layer, said incident angle $\theta$ and product H having such values as to minimize the intensity of the ultrasonic wave reflected from the reference layer;

bringing the layer of the object into contact with an ultrasonic wave propagation medium of the same material as said propagation medium;

applying an ultrasonic wave to the layer of the object through the propagation medium at the incident angle $\theta$;

measuring the frequency of the ultrasonic wave reflected from the layer to detect the frequency of the incident ultrasonic wave for the minimum reflected wave intensity; and calculating the thickness of the layer of the object from the detected frequency and the value H.

2. The method according to claim 1, wherein said step of obtaining the incident angle $\theta$ and the value H includes a process for calculating the reflection coefficient R of the ultrasonic wave applied to the reference layer with using the incident angle $\theta$ and the value H as parameters based on an elastodynamic analysis, thereby detecting the values $\theta$ and H at which the reflection coefficient R is minimized.

3. The method according to claim 1, wherein said step of obtaining the incident angle $\theta$ and the value H includes a process for preparing the reference system including the reference layer with a known thickness d, a process for measuring the reflected wave intensity of an ultrasonic wave applied to the reference layer while changing the incident angle and frequency of the ultrasonic wave, thereby detecting the incident angle $\theta$ and frequency f for the minimum reflected wave intensity, and a process for calculating the specific value H for the reference system from the frequency f and the layer thickness d.

4. The method according to claim 1, wherein said ultrasonic wave applied to the object is an ultrasonic impulsive wave having a wide range of frequency, and said step of detecting the frequency includes a process for subjecting the reflected ultrasonic wave to a frequency analysis to detect the frequency for the minimum reflected wave intensity.

5. The method according to claim 1, wherein said ultrasonic wave applied to the object is an ultrasonic impulsive wave having a wide range of frequency components, and said step of detecting the frequency includes a process for deducting power spectrum of the reflected ultrasonic wave from that of the incident ultrasonic wave by a spectral analyzer to detect the frequency for the minimum reflected wave intensity.

6. The method according to claim 1, wherein said ultrasonic wave applied to the object includes a single frequency component, and said step of applying the ultrasonic wave includes a process for continuously changing the frequency of the ultrasonic wave.

* * * * *

UNITED STATES PATENT AND TRADEMARK OFFICE
CERTIFICATE OF CORRECTION

PATENT NO. : 4,625,556

DATED : December 2, 1986

INVENTOR(S) : Yusuke Tsukahara, Eiji Takeuchi and Eisaku Hayashi

It is certified that error appears in the above—identified patent and that said Letters Patent is hereby corrected as shown below:

Title page:

Please correct the spelling of the last name of the first named inventor from "Sukahara" to --Tsukahara--.

Signed and Sealed this

Twenty-sixth Day of January, 1988

Attest:

DONALD J. QUIGG

Attesting Officer          Commissioner of Patents and Trademarks